United States Patent
Heizmann et al.

(10) Patent No.: US 6,362,579 B1
(45) Date of Patent: Mar. 26, 2002

(54) CIRCUIT FOR CORRECTION OF DEFLECTION ERRORS IN A TELEVISION DISPLAY

(75) Inventors: Friedrich Heizmann; Günter Gleim; Albert Runtze, all of Villingen-Schwenningen (DE)

(73) Assignee: Deutsche-Thomson Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/588,872

(22) Filed: Jun. 6, 2000

(30) Foreign Application Priority Data

Jun. 18, 1999 (DE) .......................................... 199 27 782

(51) Int. Cl.$^7$ ................................................. G09G 1/04
(52) U.S. Cl. ............. 315/370; 315/368.18; 315/368.12; 315/364
(58) Field of Search ............................ 315/364, 368.11, 315/368.12, 368.18, 368.24, 367, 399, 370; 348/805, 807, 808

(56) References Cited

U.S. PATENT DOCUMENTS

| | | | |
|---|---|---|---|
| 3,714,500 A | * 1/1973 | Kaashoek | 315/24 |
| 4,968,920 A | * 11/1990 | Hartmann et al. | 315/371 |
| 5,136,398 A | 8/1992 | Rodriguez-Cavazos et al. | 358/242 |
| 5,283,504 A | 2/1994 | Chauvin et al. | 315/370 |
| 5,488,271 A | 1/1996 | Gleim | 358/242 |
| 6,111,616 A | * 8/2000 | Chauvin et al. | 348/745 |

FOREIGN PATENT DOCUMENTS

| | | |
|---|---|---|
| DE | 3943421 | 7/1991 |
| DE | 4214317 | 11/1993 |
| EP | 249144 | 12/1987 |

* cited by examiner

Primary Examiner—Haissa Philogene
(74) Attorney, Agent, or Firm—Joseph S. Tripoli; Harvey D. Fried; Francis A. Davenport

(57) ABSTRACT

A circuit for correction of deflection errors in a television set, in which a correction current having alternate forward-sweep and flyback periods is supplied to a correction coil for an error parameter. An amplitude of the correction current is reduced during a time window which corresponds to the flyback period and in which no visible picture is displayed.

7 Claims, 1 Drawing Sheet

CIRCUIT FOR CORRECTION OF DEFLECTION ERRORS IN A TELEVISION DISPLAY

FIELD OF THE INVENTION

The invention relates to a circuit for correction of deflection errors in a television display and in particular to the correction of the vertical convergence in a projection television display.

BACKGROUND OF THE INVENTION

Circuits of this type are used for correction of parameters in a raster deflection, for example for correction of north/south and east/west distortion, pin-cushion distortion, non-linearity in the deflection, and other geometric and convergence errors in the horizontal and vertical directions. One particular field of application is convergence correction in a projection television set, in which the pictures from three monochrome tubes arranged alongside one another are projected onto a screen, where they are superimposed to be coincident. The term television set in this context means any equipment with an electronic raster picture display. The equipment may be fed from a television broadcast signal or else, as a pure monitor, from an RGB signal, a composite video signal, or separately with luminance and color subcarrier signals (YC) from any desired video signal source.

For example in the case of convergence correction in a projection television set, the deflection parameters are corrected by means of correction values which are stored as digital signals in a memory for the correction and are called up successively in time during the deflection process, and are converted via a D/A converter into an analogue signal forming a correction current by means of a correction coil.

The deflection errors, in particular the convergence errors in such a projection set, are in each case at their greatest at the corners of the picture and at the upper and lower edges of the picture, so that, as a rule, the correction current also assumes its maximum value at these points. The peak value of the correction current at the upper and lower picture edges may, for example, be approximately 1.5 amperes for the vertical convergence correction values. Such high currents result in a significant power loss, in the order of magnitude of approximately 5 watts/channel in the driver circuits, the output amplifiers, in the resistance loss of the correction coil and, possibly, in negative feedback resistors or current measurement resistors connected in series with the coil.

SUMMARY OF THE INVENTION

The invention reduces power losses in such a correction circuit without any adverse effect on the correction itself.

In the case of the invention, the correction current is thus reduced considerably, in particular being set to zero, during the vertical flyback period or during a time window in which no visible picture is displayed. The invention is in this case based on the following knowledge and considerations: the correction current, which generally has its maximum value at the end of the forward-sweep time, has until now continued at this maximum value during the flyback time, or has changed its mathematical sign during the flyback time. This results in a time window, in which no picture is displayed, between two forward-sweep times during which a visible picture is displayed. In consequence, no convergence correction is required during this time window since, during this time, geometric errors such as convergence errors cannot be seen in the displayed picture. The correction current is advantageously switched off during this time, without this having any adverse effect on the displayed picture. The advantage is a considerable power saving, of approximately 4 watts/channel. The reduced overall power losses also allow simpler driver circuits and output stages with simpler transistors to be implemented. Thus, overall, the invention reduces the production and operating costs of such a correction circuit considerably, without the geometric correction in the visible picture being adversely effected in the process.

The correction current is preferably set to zero during the time window. It is also conceivable for the correction current to be reduced only to a considerably lower level, and even this likewise allows a considerable power saving. The correction signal is taken from a memory and advantageously controlled at the input of a D/A converter to produce the advantageous reduction in correction current. The DIA converter converts the digital correction signal into an analogue signal forming the correction current.

One embodiment of the invention takes account of an offset which is an undesirable and unavoidable signal change or signal shift in the analogue part of the circuit by, for example offset voltages. It is assumed that the digital zero value of the digital signal is a value which produces a correction current with the value zero without any such offset error. When an offset error is present, this digital zero value then produces a correction current which is not zero. To compensate for this discrepancy, a correction is thus introduced into the digital signal. In contrast to the digital zero value, the digital value is changed to a corrected digital zero value, in which the analogue correction current that is initiated actually assumes the value zero, despite the offset error. Details of such an offset correction are described in DE 42 14 317.9, which corresponds to U.S. Pat. No. 5,488,271.

In practice, parts of lines which are located outside the visible picture area may partially intrude into the visible part of the picture owing to geometric distortion in the form of bending, unless they are corrected. Therefore, according to one embodiment of the invention, the duration and the timing of the time window with the reduction of the correction current are chosen such that the lines at the upper and lower picture edges, which would partially intrude into the visible part of the picture owing to bending if there were no correction, are located outside the time window. This ensures that the lines outside the visible picture which would interfere with the visible picture if the correction current were switched off are still subject to correction.

BRIEF DESCRIPTION OF THE DRAWINGS

The invention will be explained in the following text with reference to the drawing of an exemplary embodiment relating to the vertical convergence in a projection television set, and in which.

DETAILED DESCRIPTION OF PREFERRED EMBODIMENTS

Figure 1:
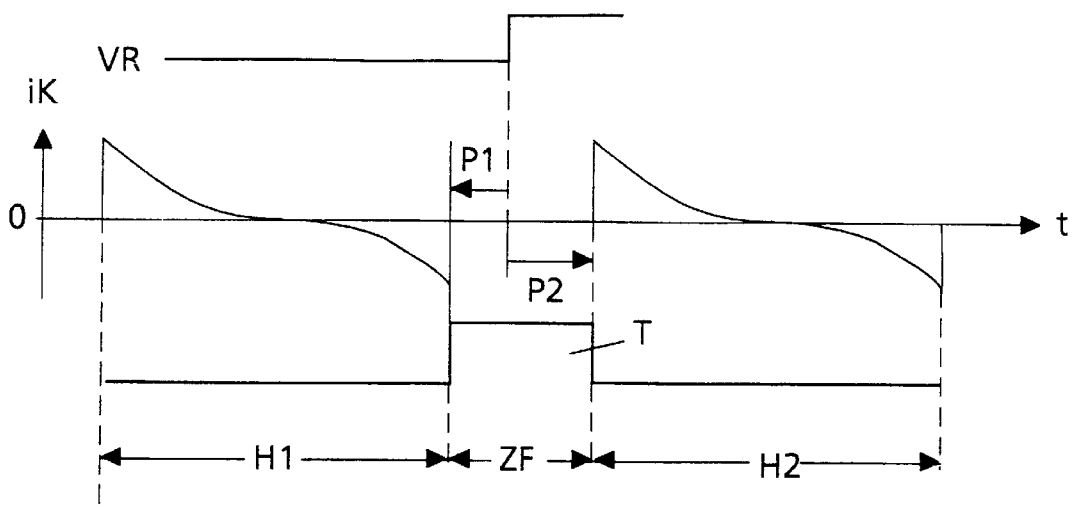
FIG. 1 shows the waveform of the correction current for two successive vertical forward-sweep periods in time, and the flyback period in between them.

FIG. 1 shows the convergence correction current ik, flowing through a correction coil, for vertical convergence as a function of time t for two successive vertical forward-sweep periods H1 and H2 in time. Between the two forward-sweep periods H1 and H2 there is a time window ZF, which corresponds approximately to the vertical flyback time. During this time window ZF, no visible picture is displayed, that is to say all the lines are located completely outside the visible picture area, either at the upper edge of the picture or at the lower edge of the picture. A clock pulse T is obtained from the vertical flyback pulse VR, and is composed of two sections P1 and P2.

The section P1 corresponds to the programmable region at the lower edge of the picture, that is to say those lines which are located outside the visible picture area and also do not project partially into the visible area in the event of the lines being deformed in the form of bending. The section P2 corresponds to the respective lines of the upper edge of the picture, which are likewise not involved in the visible picture area. The clock pulse T, whose duration is equal to the sum of the sections P1 and P2, is now used to reduce the correction current ik to a considerably lower value, irrespective of its magnitude at the end of the forward-sweep period H1 or at the start of the forwards weep period H2. In particular, the value of the correction current ik is set to zero by the clock pulse T. There is then admittedly no convergence correction. However, convergence errors cannot be seen in the picture either since no visible picture is displayed during the period T. This results in a power saving for the duration of the clock pulse T, since the correction current ik does not continue at its value at the end of the forward-sweep period Hi and, even during this period has the value at the start of the forward-sweep period H2.

Figure 2:
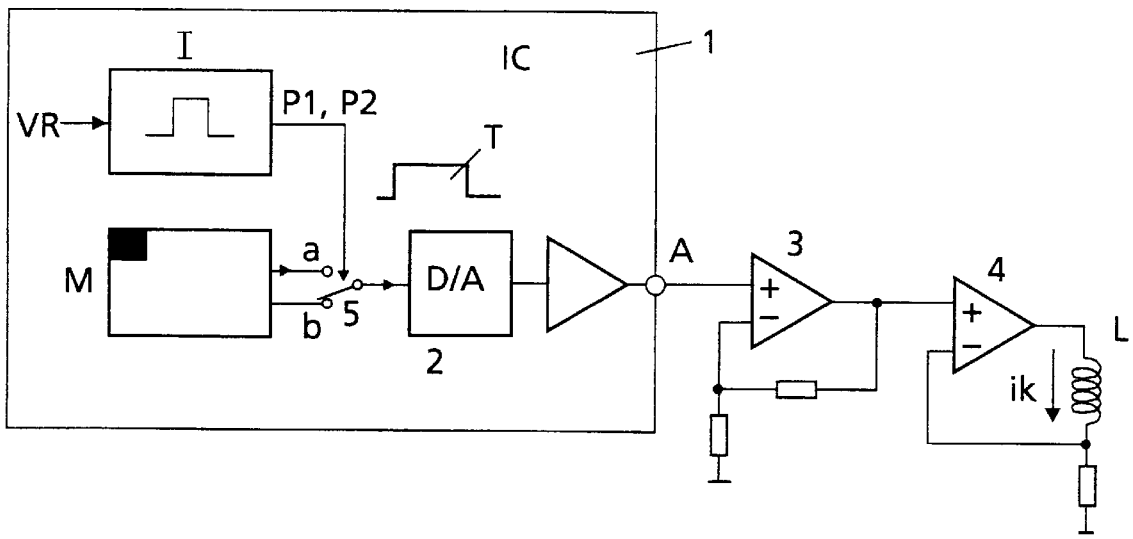
FIG. 2 shows a correction circuit designed according to the invention for producing a correction current as shown in FIG. 1.

FIG. 2 shows a convergence correction circuit which operates as shown in FIG. 1. A convergence IC1 contains a memory M, in which the respective amplitude values for the convergence correction are stored in the form of digital signals. These signals are called up successively during the scan on the screen, and are converted in the D/A converter 2 into analogue correction signals. These correction signals are passed from the,output A of the IC1 via the driver stage 3 to the output stage 4, which produces a corresponding correction current ik for the vertical convergence by means of the correction coil L. The stages 3, 4, in the form of amplifiers, are each provided with negative feedback for linearization. During the correction in the vertical forward-sweep time Hi and the vertical forward-sweep time H2, the switch S between the output of the memory M and the input of the D/A converter 2 is in the position a.

During the successive sections P1 and P2, the switch S is switched to the position b by the clock pulse T. The input of the D/A converter 2 is now at the described, corrected digital zero value stored in the memory M, that is to say a fixed value which produces zero correction current ik in the correction coil L, despite the described offset error of the analogue circuit.

The invention has been described for convergence correction. However, it can also be used for correction of any deflection or geometric error. The invention can preferably advantageously be used for correction in the vertical direction. If required, however, it can also be used for correction in the horizontal direction.

What is claimed is:

1. Circuit for correction of deflection errors in a television set, in which a correction current having alternate forward-sweep and flyback periods is supplied to a correction coil for an error parameter, wherein an amplitude of the correction current is reduced during a time window which corresponds to the flyback period and in which no visible picture is displayed.

2. Circuit according to claim 1, wherein said amplitude of the correction current is reduced to a value zero.

3. Circuit according to claim 1, wherein values of a correction current are contained as a digital correction signal in a memory and are read successively in time during the scan, and are converted in a D/A converter into analogue values for the respective correction current.

4. Circuit according to claim 3, wherein said correction current is reduced by controlling said digital signal at the input of the D/A converter.

5. Circuit according to claim 3, wherein said digital correction signal has a digital zero value during said time window, which is corrected in such a way that said correction current flowing through the correction coil assumes a substantially zero value in the presence of offset errors in an analogue circuit processing said correction signal.

6. Circuit according to claim 1, wherein a duration and timing of said time window are chosen such that lines at the upper and lower picture edges located outside the visible picture are subject to deformation and intrude into the visible picture part, said lines are located outside said time window.

7. Circuit according to claim 1, wherein said amplitude of said correction current is reduced by means of a clock pulse which consists of two successive sections, a first section corresponds to lines at the lower picture edge which are not visible when a picture is displayed, and a second section corresponds to lines at the upper picture edge which are not visible when a picture is displayed.

* * * * *